US00RE45448E

(19) United States
(12) Reissued Patent
Becklin

(10) Patent Number: US RE45,448 E
(45) Date of Reissued Patent: Apr. 7, 2015

(54) STACKABLE CONTAINER APPARATUS AND METHODS

(71) Applicant: Becklin Holdings, Inc., Reno, NV (US)

(72) Inventor: Dennis M. Becklin, Grants Pass, OR (US)

(73) Assignee: Becklin Holdings, Inc., Grants Pass, OR (US)

(21) Appl. No.: 14/093,183

(22) Filed: Nov. 29, 2013

Related U.S. Patent Documents

Reissue of:
(64) Patent No.: 7,740,138
Issued: Jun. 22, 2010
Appl. No.: 12/171,970
Filed: Jul. 11, 2008

U.S. Applications:
(63) Continuation of application No. 12/966,775, filed on Dec. 13, 2010, now Pat. No. Re. 44,656.

(51) Int. Cl.
*B65D 21/036* (2006.01)
*B65D 21/032* (2006.01)
*B65D 21/02* (2006.01)

(52) U.S. Cl.
CPC ..... *B65D 21/0223* (2013.01); *B65D 21/0222* (2013.01)

(58) Field of Classification Search
CPC ..... B65D 21/0235; B65D 21/0217; B65D 21/0222; B65D 21/0223; B65D 21/0209
USPC ..... 206/508, 509, 511, 504, 503; 220/23.86, 23.83, 23.6, 23.2; 29/525; D9/432, 430
IPC ..... B65D 21/036, 21/032, 21/02, 21/00
See application file for complete search history.

(56) References Cited

U.S. PATENT DOCUMENTS

| | | | | |
|---|---|---|---|---|
| 879,455 | A | 2/1908 | Frost | |
| 2,695,115 | A | 11/1954 | Roop | |
| 2,753,077 | A * | 7/1956 | Greco | 206/504 |
| 2,822,952 | A * | 2/1958 | Scott | 206/504 |
| 2,849,151 | A | 8/1958 | Heil | |
| 3,103,278 | A | 9/1963 | Kuzma et al. | |

(Continued)

FOREIGN PATENT DOCUMENTS

JP 05254542 A * 10/1993

OTHER PUBLICATIONS

Thermodyne [Mehrwegcontainer, Industriecontainer,], www.thermodyne.de/systembehaelter.php, Sep. 17, 2013.

*Primary Examiner* — Robert J Hicks
(74) *Attorney, Agent, or Firm* — Lowe Graham Jones PLLC

(57) ABSTRACT

A stackable container assembly includes a lid portion having first raised members projecting outwardly from an upper surface, at least some of the first raised members cooperatively forming first receiving areas, and a base portion coupleable to the lid portion and forming a containment space. The base portion includes second raised members projecting outwardly from a lower surface, at least some of the second raised members cooperatively forming second receiving areas being adapted to fittingly receive first raised members of a like container assembly positioned below the lower surface. And, the first receiving areas are adapted to fittingly receive second raised members of another like container assembly positioned above the upper surface.

20 Claims, 6 Drawing Sheets

(56) References Cited

U.S. PATENT DOCUMENTS

| | | | | | |
|---|---|---|---|---|---|
| 3,117,692 | A | | 1/1964 | Carpenter et al. | |
| 3,383,009 | A | | 5/1968 | Weikert | |
| 3,391,824 | A | | 7/1968 | Wiseman | |
| 3,419,184 | A | | 12/1968 | Asenbauer | |
| 3,481,502 | A | | 12/1969 | Slayman | |
| 3,524,415 | A | | 8/1970 | Heiman et al. | |
| 3,616,943 | A | | 11/1971 | Brink | |
| 3,754,645 | A | | 8/1973 | Kilroy | |
| 3,758,396 | A | | 9/1973 | Kilroy | |
| 3,759,416 | A | | 9/1973 | Constantine | |
| 3,968,879 | A | | 7/1976 | Lucas, Sr. et al. | |
| 4,287,997 | A | | 9/1981 | Rolfe et al. | |
| 4,373,633 | A | * | 2/1983 | Lutz, Sr. | 206/508 |
| 4,413,737 | A | | 11/1983 | Wind | |
| 4,655,360 | A | | 4/1987 | Juhanson | |
| 4,671,411 | A | | 6/1987 | Rehrig et al. | |
| 4,765,252 | A | | 8/1988 | Shuert | |
| 4,832,200 | A | | 5/1989 | Deaton et al. | |
| 4,848,605 | A | | 7/1989 | Wise | |
| 5,042,674 | A | * | 8/1991 | Ramsay et al. | 220/4.24 |
| D333,094 | S | | 2/1993 | Zutler | |
| D333,978 | S | * | 3/1993 | Zutler | D9/424 |
| 5,203,494 | A | | 4/1993 | Blomfield | |
| 5,392,945 | A | | 2/1995 | Syrek | |
| D361,715 | S | | 8/1995 | Haupert | |
| 5,454,477 | A | | 10/1995 | Bornhorst et al. | |
| 5,566,824 | A | | 10/1996 | Tack et al. | |
| 5,641,090 | A | | 6/1997 | Kowalski et al. | |
| 5,718,350 | A | | 2/1998 | Williams | |
| 5,769,230 | A | | 6/1998 | Koefelda | |
| 5,779,051 | A | | 7/1998 | Boutin | |
| D420,396 | S | * | 2/2000 | Vieslet | D21/690 |
| 6,021,916 | A | | 2/2000 | Stolzman | |
| 6,085,467 | A | | 7/2000 | Packrall et al. | |
| 6,186,345 | B1 | | 2/2001 | Robertson | |
| 6,237,758 | B1 | | 5/2001 | Hsu | |
| D446,017 | S | | 8/2001 | Koefelda | |
| 6,308,858 | B1 | | 10/2001 | Koefelda | |
| 6,371,364 | B1 | | 4/2002 | Maillot et al. | |
| 6,457,599 | B1 | | 10/2002 | Apps et al. | |
| 6,585,090 | B2 | | 7/2003 | Harvey | |
| 6,662,950 | B1 | | 12/2003 | Cleaver | |
| D500,924 | S | | 1/2005 | Martin et al. | |
| 7,163,122 | B2 | | 1/2007 | Elder et al. | |
| 2004/0178208 | A1 | | 9/2004 | Leba et al. | |
| 2006/0254947 | A1 | | 11/2006 | Rogers | |

* cited by examiner

STACKABLE CONTAINER APPARATUS AND METHODS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM

This application is a [divisional of pending U.S. patent application entitled "STACKABLE CONTAINER APPARATUS AND METHODS", and assigned] *continuation reissue of reissue application Ser. No. 12/966,775 filed on Dec. 13, 2010, and is a reissue of U.S. Pat. No. 7,740,138 issued Jun. 22, 2010 which claims benefit to* U.S. Ser. No. 11/128,923, filed on May 12, 2005.

FIELD OF THE INVENTION

This invention relates to containers for storing and transporting products, such as electronics equipment, and more specifically, to stackable container apparatus and methods.

BACKGROUND OF THE INVENTION

A wide variety of products are stored and transported in containers. It is often desirable to stack the containers during storage and transport to effectively utilize the available space within the storage facility or the transport vehicle. A variety of containers are known which provide some capability to be stacked, including the various containers disclosed, for example, in U.S. Pat. No. 6,457,599 B1 issued to Apps et al., U.S. Pat. No. 6,237,758 B1 issued to Hsu, U.S. Pat. No. 6,186,345 B1 issued to Robertson, U.S. Pat. No. 6,085,467 issued to Packrall et al., U.S. Pat. No. 5,769,230 issued to Koefelda, U.S. Pat. No. 5,203,494 issued to Blomfield, and U.S. Pat. No. 4,655,360 issued to Juhanson. Although desirable results have been achieved using such prior art containers, there is room for improvement.

SUMMARY OF THE INVENTION

The present invention is directed to stackable container apparatus and methods. Embodiments of apparatus and methods in accordance with the present invention may advantageously provide an improved capability to stack a plurality of containers in a secure, non-sliding manner, and may substantially improve a user's ability to store products, and may also reduce or eliminate the need for specially-crafted foam inserts, in comparison with prior art containers.

In one embodiment, a container assembly in accordance with the invention includes a lid portion and a base portion coupleable to the lid portion and forming a containment space. The lid portion has an upper surface and includes a plurality of first raised members projecting outwardly from the upper surface, at least some of the first raised members cooperatively forming a plurality of first receiving areas. Similarly, the base portion has a lower surface and includes a plurality of second raised members projecting outwardly from the lower surface, at least some of the second raised members cooperatively forming a plurality of second receiving areas. The second receiving areas are adapted to fittingly receive a second plurality of first raised members of a like container assembly positioned below the lower surface, and the first receiving areas are adapted to fittingly receive a second plurality of the second raised members of another like container assembly positioned above the upper surface.

BRIEF DESCRIPTION OF THE DRAWINGS

Preferred and alternate embodiments of the invention are described in detail below with reference to the following drawings.

Figure 10B:
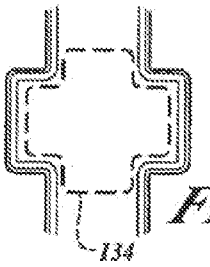
Figure 10A:
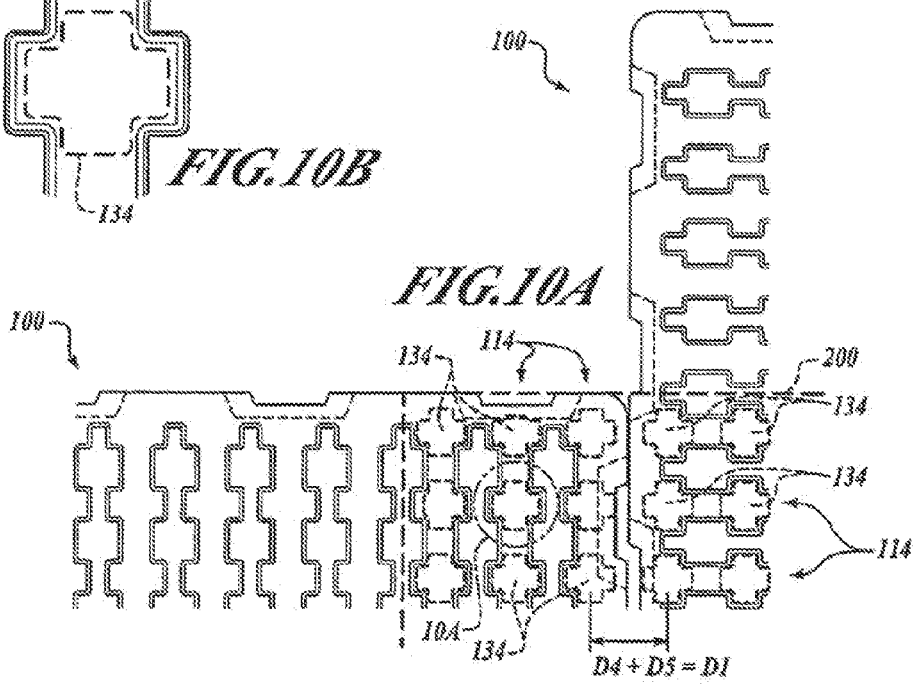

FIG. [10] *10A* is an enlarged top elevational view of an upper stackable container engaged with the plurality of lower stackable containers in accordance with a further embodiment of the invention;

*FIG. 10B is a close-up view of a raised cleat from FIG. 10A;*

Figure 11:
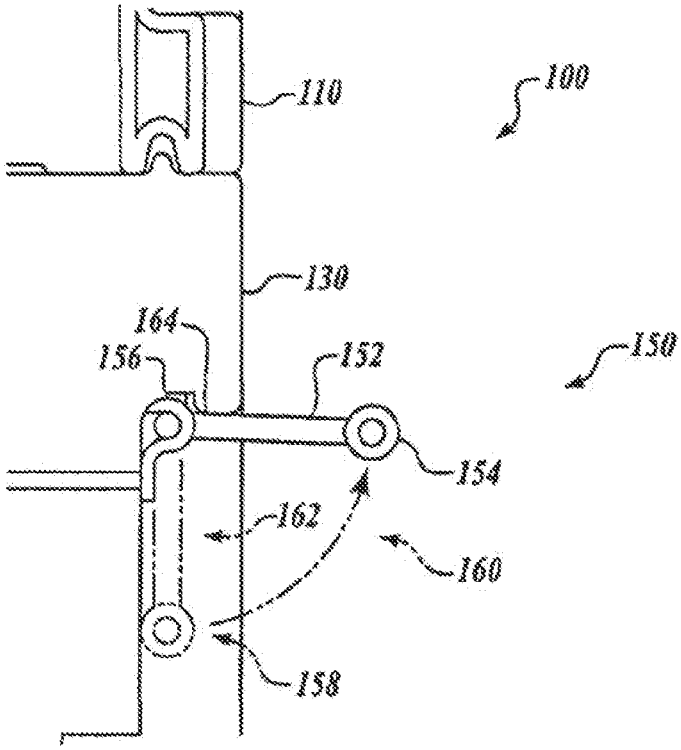
Figure 12:
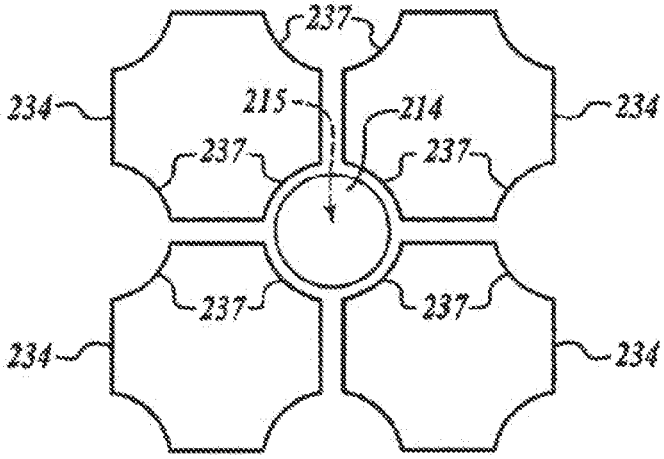

FIG. 11 is an enlarged, side elevational view of a handle assembly of a stackable container in accordance with yet another embodiment of the invention; and FIG. 12 is a top elevational view of a first raised member received into an approximately circular receiving area formed by a plurality of second raised members in accordance with an alternate embodiment of the invention.

DETAILED DESCRIPTION

The present invention relates to stackable container apparatus and methods. Many specific details of certain embodiments of the invention are set forth in the following description and in FIGS. 1-12 to provide a thorough understanding of such embodiments. The present invention may have additional embodiments, or may be practiced without one or more of the details described for any particular described embodiment.

Figure 1:
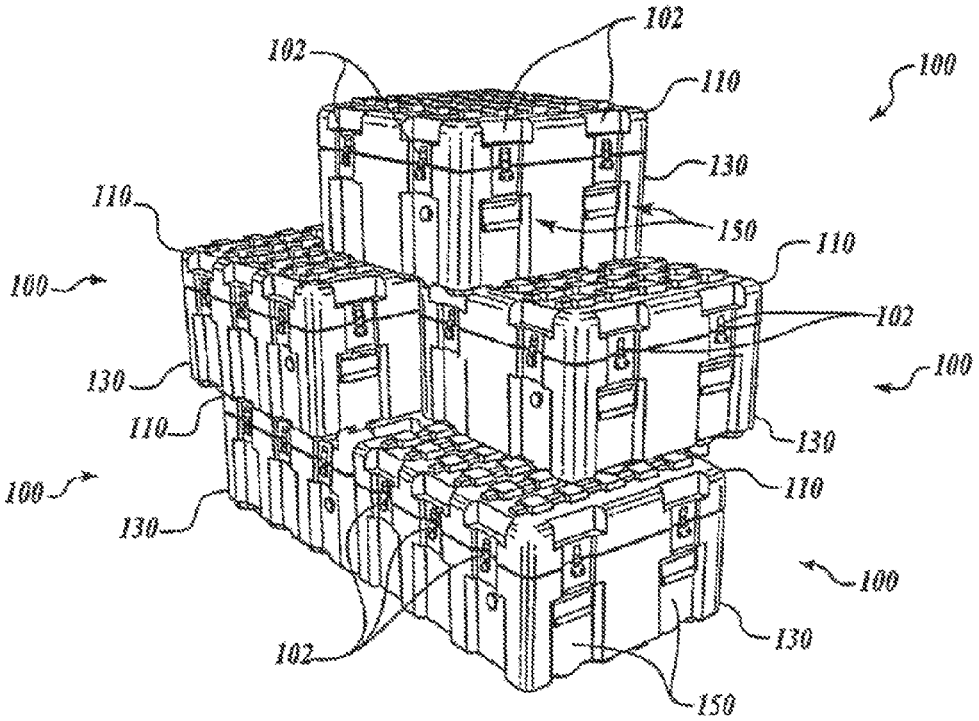
FIG. 1 is an isometric view of a plurality of stackable containers in accordance with an embodiment of the invention.

FIG. 1 is an isometric view of a plurality of stackable containers 100 in accordance with an embodiment of the invention. In this embodiment, each stackable container 100 includes a lid portion 110 that is removably coupled to a base portion 130 by a plurality of latches 102. The base portion 130 includes a plurality of handle assemblies 150 to facilitate lifting and transport of the container 100.

In one particular embodiment, the stackable containers 100 are formed of rotomolded polyethylene. In alternate embodiments, other suitable materials may be used. In another embodiment, the containers 100 may be hermetically sealable and shock resistant, and may be suitable for the transport of sensitive electronic equipment from a supplier to an end user. In a further embodiment, the stackable containers 100 are sized and adapted for use in conjunction with the United States military's most common air transport pallet, the 463L, and standard cargo netting.

Figure 2:
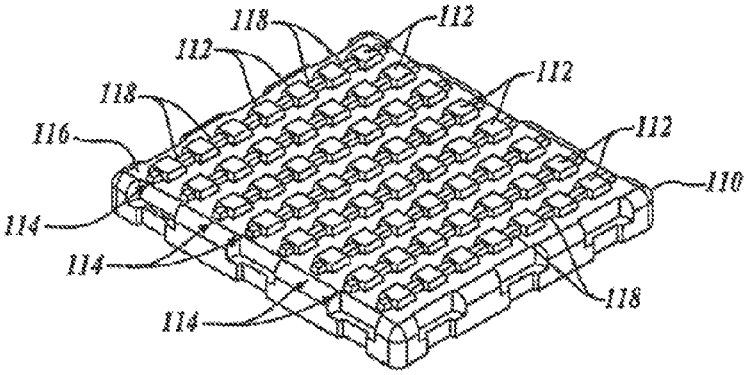
FIG. 2 is an isometric view of a lid portion of a stackable container of FIG. 1 in accordance with an embodiment of the invention.

FIG. 2 is an isometric view of the lid portion 110 of the stackable container 100 of FIG. 1. In this embodiment, the lid portion 110 includes an upper surface 116 having a plurality of raised rows 114. Each raised row 114 includes a plurality of raised bosses 112 connected by a plurality of raised ribs 118. The raised rows 114 improve the structural rigidity of the lid portion 110, and provide a capability to stack a plurality of the containers 100, as described more fully below.

Figure 3:
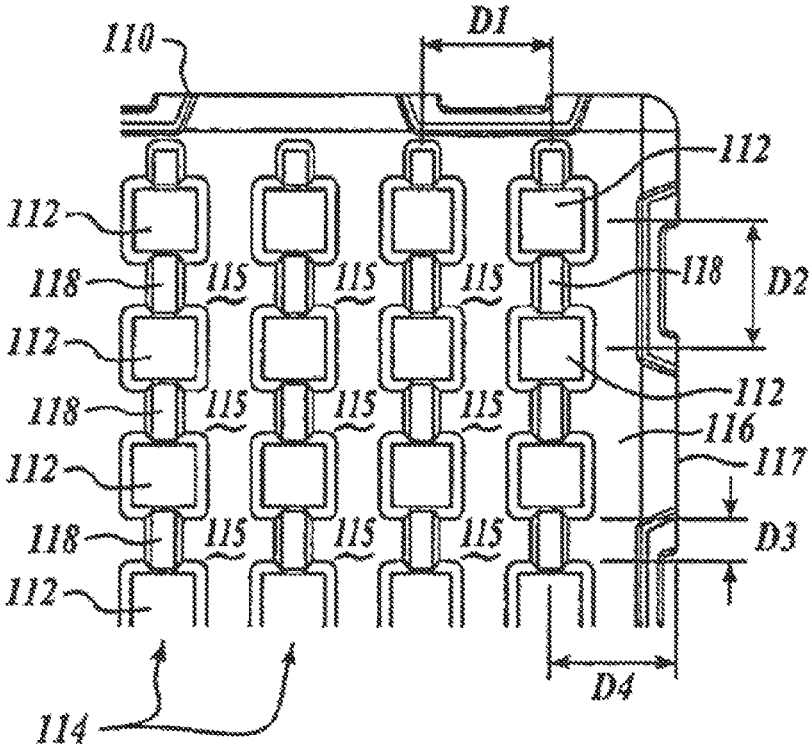
FIG. 3 is an enlarged, partial top elevational view of the lid portion of FIG. 2.
Figure 4:
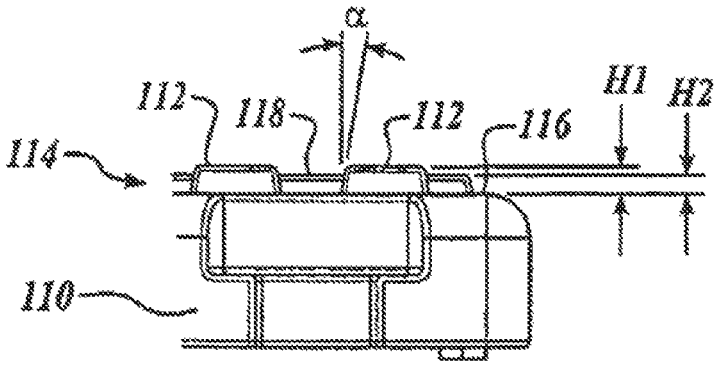
FIG. 4 is an enlarged, partial side elevational view of the lid portion of FIG. 2.

FIGS. 3 and 4 are top and side elevational views, respectively, of the lid portion 110 of FIG. 2. As shown in FIG. 3, the raised rows 114 are separated by a first distance D1, and the centers of the raised bosses 112 are separated by a second distance D2. The raised bosses 112 and the raised ribs 118 are sized such that the edges of successive raised bosses 112 are separated by a third distance D3 along each of the raised rows 114. The raised rows 114 are adapted such that a plurality of first receiving areas 115 are formed between adjacent raised rows 114. As further shown in FIG. 3, an outermost raised row 114 is separated from an outermost edge 117 of the lid portion 110 by a fourth distance D4. Also, as shown in FIG. 4, the raised bosses 112 have a first height H1, the raised ribs 118 have a second height H2, and the edges of the raised bosses 112 and the raised ribs 118 are oriented at a draft angle $\alpha$ with respect to an axis that is vertical to the upper surface 116.

In one particular embodiment, each of the raised bosses 112 has an approximately square shape measuring 2.5 inches by 2.5 inches when viewed from above (FIG. 3), and each of the raised ribs 118 has an approximately rectangular shape when viewed from above. In one particular embodiment, the first height H1 is 0.75 inches, the second height H2 is 0.5 inches, and the draft angle $\alpha$ is 10 degrees. Furthermore, in a particular embodiment, each of the raised rows 114 is separated by a first distance D1 of 4.2 inches, the raised bosses 112 are separated by a second distance D2 of 4.2 inches, and the fourth distance D4 is approximately equal of the first distance D1 (e.g. 2.1 inches). Of course, in alternate embodiments, the raised bosses 112 and the raised ribs 118 may have different shapes and dimensions, and the raised rows 114 may have different distances D1, D2, D3, and D4, from the particular embodiment shown in FIGS. 2-4.

Figure 5:
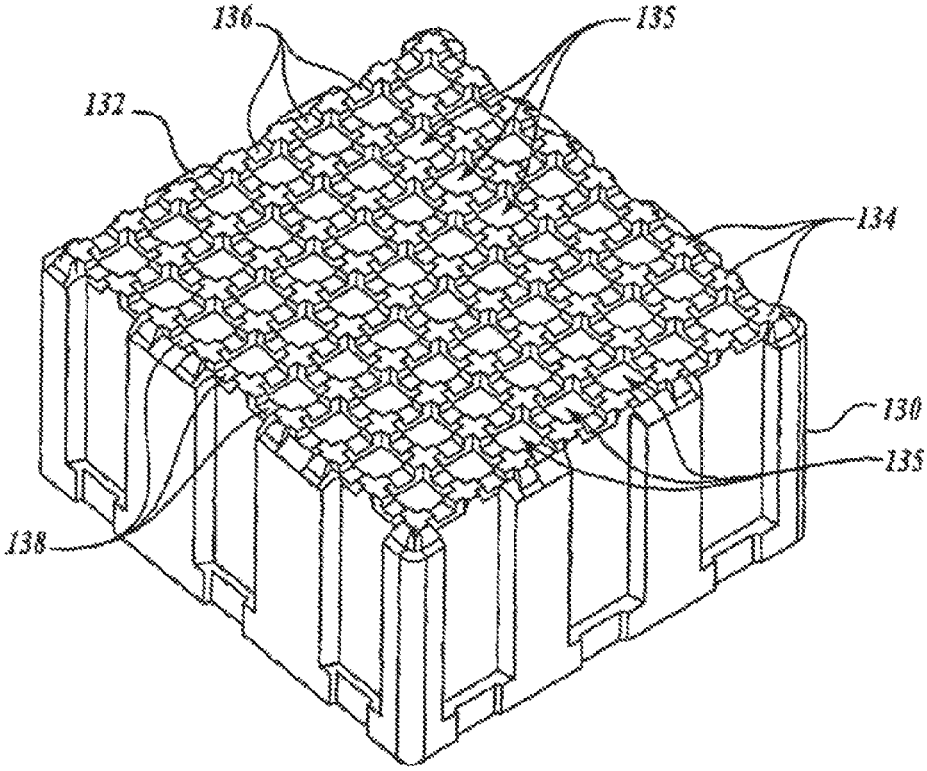
FIG. 5 is an isometric view of a base portion of the stackable container of FIG. 1 in an inverted position in accordance with an embodiment of the invention.

FIG. 5 is an isometric view of the base portion 130 of one of the stackable containers 100 of FIG. 1 in an inverted position. In this embodiment, the base portion 130 includes a lower surface 132 having a plurality of raised cleats 134 formed thereon. A plurality of first ridges 136 extend along a first (or lateral) direction between adjacent cleats 134, and a plurality of second ridges 138 extend along a second (or longitudinal) direction between adjacent cleats 134. The raised cleats 134, the first ridges 136, and the second ridges 138 cooperatively form a plurality of second receiving areas 135 distributed across the lower surface 132 of the base portion 130.

Figure 6:
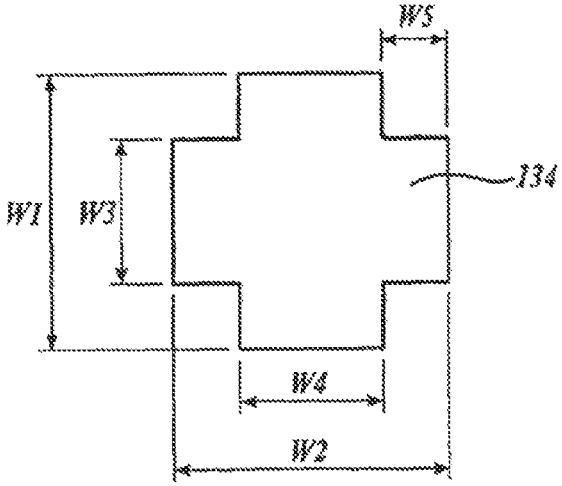
FIG. 6 is an enlarged, top elevational view of a stacking cleat of the base portion of FIG. 5.
Figure 7:
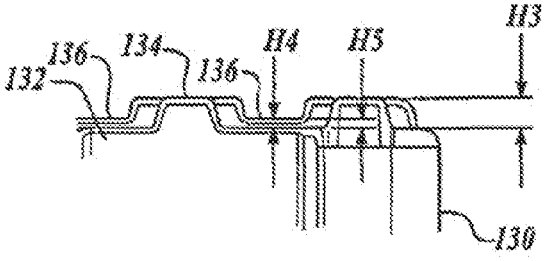
FIG. 7 is an enlarged, side elevational view of the stacking cleat of FIG. 5.

FIGS. 6 and 7 are top and side elevational views, respectively, of one of the stacking cleats 134 of the base portion 130 of FIG. 5. In this embodiment, the stacking cleat 134 has a "cross" or "plus sign" shape (i.e. "+") when viewed from above (FIG. 6). As shown in FIG. 6, the stacking cleat 134 has a primary longitudinal dimension W1, a primary lateral dimension W2, a secondary longitudinal dimension W3, a secondary lateral dimension W4, and an arm length W5. Also, as shown in FIG. 7, the stacking cleat 134 projects outwardly from the lower surface 132 by a third height H3, the lateral ridges 136 project outwardly by a fourth height H4, and the longitudinal ridges 138 project outwardly by a fifth height H5. Generally, the stacking cleats 134 are distributed over the lower surface 132 of the bottom portion 130 and are adapted to engage with the receiving portions 115 of the lid portion 110 of an adjacent container 100, as described more fully below.

In one embodiment, as shown in FIG. 6, the primary longitudinal dimension W1 is equal to the primary lateral dimension W2, and the secondary longitudinal dimension W3 is equal to the secondary lateral dimension W4. More specifically, in one particular embodiment, W1=W2=2.85 inches, W3=W4=1.45 inches, and W5=0.70 inches. Furthermore, in one particular embodiment, the stacking cleats 134 project outwardly from the lower surface 132 by the third height H3 of approximately 0.75 inches, and the lateral and longitudinal ridges 136, 138 project outwardly from the tower surface 132 by 0.25 inches (i.e. H4=H5=0.25 inches).

Figure 8:
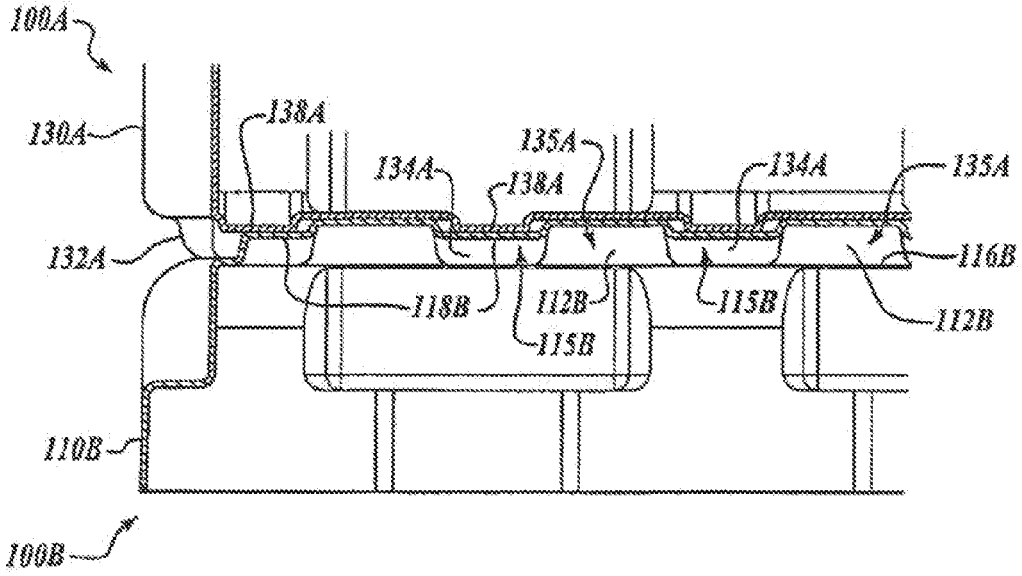
FIG. 8 is an enlarged side elevational view of an upper stackable container engaged with a lower stackable container in accordance with an embodiment of the invention.

FIG. 8 is an enlarged side elevational view of an upper stackable container 100A engaged with a lower stackable container 100B in accordance with an embodiment of the invention. As shown in FIG. 8, the base portion 130A of the upper stackable container 100A is engaged with the lid portion 110B of the lower stackable container 100B. More specifically, the raised cleats 134A of the base portion 130A are engaged into the first receiving areas 115B of the lid portion 110B, and the raised bosses 112B of the lid portion 110B are engaged into the second receiving areas 135A of the base portion 130A.

In one particular embodiment, the raised cleats 134A and the raised bosses 112B are sized and adapted so that the raised bosses 112B engage against the lower surface 132A of the lower portion 130A of the upper container 100A, and the raised cleats 134A engage against the upper surface 116B of the lid portion 110B of the lower container 100B. The contact between the raised bosses 112B and the lower surface 132A, and the contact between the raised cleats 134A and the upper surface 116B, may advantageously improve the load carrying capabilities of the containers 100A, 100B, and may reduce or prevent deformation of the lid and base portions 110B, 130A under heavy loads, elevated temperatures, or other operating conditions.

Similarly, in a further embodiment, at least one of the first and second ridges 136A, 138A of the lower portion 130A of the upper container 100A are sized and adapted to engage with the ribs 118B of the lid portion 110B of the lower container 100B. Again, this contact between the ridges 136A, 138A, and the ribs 118B may improve the load carrying capabilities of the containers 100A, 100B, and may reduce or prevent deformation of the lid and base portions 110B, 130A.

Embodiments of the present invention may provide significant advantages over prior art stackable containers. Because the raised cleats 134A of the base portion 130A are engaged into the first receiving areas 115B of the lid portion 110B, and the raised bosses 112B of the lid portion 110B are engaged into the second receiving areas 135A of the base portion 130A, the upper container 100A may be securely engaged with the lower container 100B in the stacked position (FIG. 8), thereby preventing slipping and sliding of the upper container 100A relative to the lower container 100B in the lateral and longitudinal directions.

Furthermore, because the second receiving areas 135A of the base portion 130A are formed over the lower surface 132A by the cooperation of the raised cleats 134A (and the first and second ridges 136A, 138A) rather than by forming indentations or recesses in the lower surface 132A, an inside surface (not shown) of the base portion 130A (opposite from the lower surface 130A) may remain relatively smooth and even. The resulting relatively smooth inner surface may substantially improve a user's ability to store products in the container 100A, and may advantageously reduce or eliminate the need for specially-crafted foam cushions having relief cuts, indentations, or other means of accommodating the protrusions or irregularities that exist on the inner surfaces of at least some prior art containers. Similarly, because the first receiving areas 115B of the lid portion 110B are formed over the upper service 116B by the cooperation of the raised bosses 112B (and the raised ribs 118B), an inner surface (not shown) of the lid portion 110B (opposite from the upper surface 116B) also remains relatively smooth and even, which may also substantially improve a user's ability to store products in the container 100B.

Figure 9:
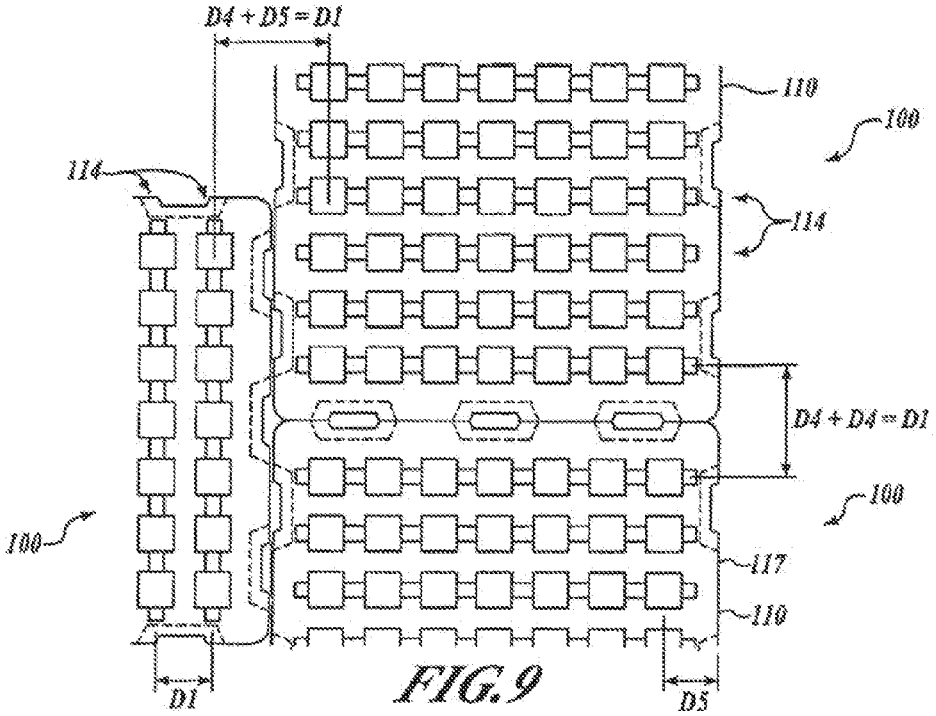
FIG. 9 is a top elevational view of a plurality of stackable containers of FIG. 1.

Embodiments the present invention may also provide improved interlocking features between successive layers of stackable containers 100. For example, FIG. 9 is a top elevational view of a plurality of stackable containers 100 in a first (or lower) level in accordance with an embodiment of the present invention. As described above with reference to FIG. 3, each of the raised rows 114 is separated by the first distance D1, and the outermost raised row 114 is separated from the outer edge 117 of the lid portion 110 by the fourth distance D4. In one embodiment, the fourth distance D4 may be approximately equal to the first distance D1. Similarly, the last raised boss 112 of each raised row 114 may be separated from the outer edge 117 by a fifth distance D5, and the fifth distance D5 may also be approximately equal to the first distance D1. Therefore, in the embodiment shown in FIG. 9, D4+D4=2D1, and D4+D5=2D1.

FIG. [10] *10A* is a partial top elevational view of an upper stackable container 200 engaged with the plurality of lower stackable containers 100 of FIG. 9. *FIG. 10B is a close-up view of one of the raised cleats from FIG. 10A.* In this embodiment, the upper stackable container 200 spans across a plurality of lower stackable containers 100, with the raised cleats 134 of the base portion 130 engaged in to the first receiving areas 115 on a plurality of lid portions 110 of lower stackable containers 100. Because the fourth distance D4 (the distance from the outermost raised row 114 to the outer edge 117) and the fifth distance D5 (the distance from the last raised boss 112 to the outer edge 117) are both equal to the first distance D1 (the distance between successive raised rows 114), the upper stackable container 200 may span between two lower containers 100 even though the raised rows 114 of the two lower containers 100 are not aligned, but rather, are oriented at 90° angles. Similarly, because the fourth distance D4 is approximately equal to the first distance D1, the upper stackable container 200 may span between two lower containers 100 when the raised rows 114 of the two adjacent lower containers 100 are aligned (running in approximately parallel directions). Thus, embodiments of the present invention may provide enhanced, interlocking, stacking capability between successive levels of stackable containers 100, 200.

FIG. 11 is an enlarged, side elevational view of the handle assembly 150 of the stackable container 100 of FIG. 1 in accordance with yet another embodiment of the invention. In this embodiment, the handle assembly 150 includes a support arm 152 coupled to a handle member 154. The support arm 152 is pivotably coupled to the base portion 130 by a hinge 156 located within a recess 158 in the base portion 130. In operation, the support arm 152 and the handle member 154 are swingably (or pivotably) movable between a deployed (or lifting) position 160, and a stowed (or non-lifting) position 162. As shown in FIG. 11, in the deployed position 160, the support arm 152 rotates outwardly within the hinge 156 until the support arm 152 engages with a support surface 164 of the base portion 130.

In operation, a user may lift upwardly on the handle member 154 until the support arm 152 engages with the support surface 164 in the deployed position 160. If the user provides further lifting force on the handle member 154, the support arm 152 is prevented from further up for rotation by the support surface 164. After the container 100 is lifted and moved to a desired position, the support arm 152 may be rotated downwardly into the stowed position 162. In the stowed position 162, the support arm 152 and handle member 154 are contained within the recess 158.

Embodiments of the present invention may provide further advantages in comparison with the prior art. For example, in the deployed position 160, because the support arm 152 is prevented from further rotation upwardly by the support surface 164, the user may exert a lifting force on the handle member 154 without causing the handle member 154 to pinch the user's hand against an outer surface of the base portion 130. Similarly, in the stowed position 162, because the support arm 152 and handle member 154 may be disposed within the recess 158 in the base portion 130, the support arm 152 and handle member 154 may be at least partially protected from damage, and may allow a tighter packing between adjacent containers 100.

Alternate embodiments of the present invention may be conceived, and it will be appreciated that the invention is not limited to the particular embodiments described above and shown in FIGS. 1-11. For example, greater or fewer numbers of raised bosses and stacking cleats may be provided on the upper and lower surfaces of the container from that shown in the accompanying figures. Similarly, the raised bosses and stacking cleats may be distributed over the upper and lower surfaces in different patterns and the particular embodiments described above and shown in the company figures. In addition, as described above, the shapes of the raised bosses and stacking cleats may be varied from those particular embodiments described above. For example, in one alternate embodiment, the shapes of the raised bosses 114 and the stacking cleats 134 may be reversed from the embodiments shown in FIGS. 1-11, such that the raised bosses have a "cross" or "plus sign" shape, and the stacking cleats have a "square" shape.

In a further embodiment, as shown in FIG. 12, a first raised member 214 may be approximately circular in shape, and may be fittingly received into an approximately circular receiving area 215 forward by a plurality of second raised members 234, each of the second raised members 234 having one or more contoured edges 237 that cooperatively form the circular receiving area 215. The first raised members 214 may be formed on the upper surface of the lid portion 110, in the second raised members 234 may be formed on the lower surface of the base portion 130, or vice versa. Of course, a variety of other shapes of first and second raised members may be conceived that provide the desired interlocking capability of the base portion of the upper container and the lid portion of the lower container, including, for example, triangular shapes, diamond shapes, polygonal shapes, and even non-polygonal or irregular shapes.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for stacking containers, comprising:

obtaining at least a first container and a second container, each having a lid portion and a base portion, each lid portion having a plurality of first raised members each projecting outwardly from a lid surface and arranged substantially in a first desired direction, each lid portion further including a plurality of first ribs projecting outwardly from the lid surface, each of the plurality of first ribs extending substantially continuously between adjacently located first raised members and oriented along the first desired direction, at least some of the first raised members and first ribs cooperatively forming a plurality of first receiving areas, wherein the plurality of first raised members project outwardly by an amount that is greater than the outward projection of the plurality of first ribs relative to the lid surface, each base portion having a plurality of second raised members each projecting outwardly from a base surface and arranged substantially in a second desired direction, each base portion further including a plurality of second ribs projecting outwardly from the base surface, each of the plurality of second ribs extending substantially continuously between adjacently located second raised members and oriented along the second desired direction, at least some of the second raised members and second ribs cooperatively forming a plurality of second receiving areas, wherein the plurality of second raised members project outwardly by an amount that is greater than the outward projection of the plurality of second ribs relative to the base surface; and stacking the first and second containers relative to each other such that at least some of the raised members of one of the containers are received by corresponding receiving areas of the other container.

2. The method of claim 1, wherein obtaining the first and second containers includes obtaining the lid portions wherein the plurality of first raised members are square-shaped raised members and further includes obtaining the base portions wherein the plurality of second raised members are plus-sign-shaped raised members.

3. The method of claim 1, wherein stacking the first and second containers includes laterally offsetting the lid portion of the one of the containers relative to the base portion of the other container.

4. The method of claim 1, wherein stacking the first and second containers includes contacting the first raised members with the base surface of one of the containers and contacting the second raised members with the lid surface of the other container.

*5. A system comprising:*

*a first container assembly including a first upper portion having a plurality of upper stacking features, each upper stacking feature includes first raised members and a plurality of first ribs projecting outwardly from a surface of the upper portion, each of the plurality of first ribs extending substantially continuously between adjacently located first raised members, each of the first raised members and first ribs projecting outwardly from an upper stacking surface, each first raised member having at least one of a width that exceeds a corresponding width of each first rib and a height that exceeds a corresponding height of each first rib; and*

*a second container assembly including a second upper portion that includes second upper stacking features substantially identical to the first upper stacking features and including a plurality of second raised members and a plurality of second ribs, each of the plurality of second ribs extending substantially continuously between adjacently located second raised members;*

*wherein the first container assembly further includes a first base positioned below the upper portion and having a containment volume, the first base having a plurality of base stacking features arranged to engagingly cooperate with the second container assembly, wherein the second upper portion is positionable beneath the first base,*

*wherein the base stacking features include a plurality of base first members arranged in an array and positioned such that each base first member is inserted between adjacent second upper stacking features having each base first member inserted between adjacent pairs of second raised members of each of the adjacent second upper stacking features.*

*6. The system of claim 5, wherein the base first members continuously adjoined to base second members, each of the base first and base second members projecting outwardly from a base stacking surface, each base first member of the set having a width that exceeds a corresponding width of each base second member of the set.*

*7. The system of claim 5, wherein a height of the first raised members exceeds a height of the first rib relative to the upper stacking surface.*

*8. The system of claim 5, wherein a linear distance between the first raised members of adjacent upper stacking features is less than a corresponding linear distance between first ribs of adjacent upper stacking features.*

*9. The system of claim 5, wherein the upper stacking features of at least the first upper portion are disposed in at least two rows on the upper stacking surface, a first centerline of a first row being separated from a second centerline of a second row by a desired distance.*

*10. The system of claim 5, further comprising a plurality of second raised members projecting from a base stacking surface.*

*11. The system of claim 5, wherein the upper stacking feature of the first upper portion are oriented substantially parallel relative to an edge of the first upper portion.*

*12. A system comprising:*

*a first container assembly including a first upper portion having a plurality of upper stacking features, each upper stacking feature includes first raised members and a plurality of first ribs projecting outwardly from a surface of the upper portion, each of the plurality of first ribs extending substantially continuously between adjacently located first raised members, each of the first raised members and first ribs projecting outwardly from an upper stacking surface, each first raised member having a width that exceeds a corresponding width of each first rib; and*

*a second container assembly including a second upper portion that includes upper stacking features substantially identical to the first upper stacking features and including a plurality of second raised members and a plurality of second ribs, each of the plurality of second ribs extending substantially continuously between adjacently located second raised members;*

*wherein the first container assembly further includes a first base, the first base and the first upper portion defining a containment volume, the first base having a plurality of base stacking features arranged in an array such that each base stacking feature is positionable at least one of between adjacent second upper stacking features and between adjacent second raised members of the adja-*

*cent second upper stacking features, wherein the second upper portion is positionable beneath the first base.*

*13. A system comprising:*

*a first container assembly including a stacking portion having a plurality of stacking features, each stacking feature including raised members and a plurality of ribs projecting outwardly from a surface of the stacking portion, each of the plurality of ribs extending substantially continuously between adjacently located raised members, each of the raised members and ribs projecting outwardly from a stacking surface, each raised member having at least one of a width that exceeds a corresponding width of each rib and a height that exceeds a corresponding height of each rib,*

*wherein the first container assembly further includes an opposing portion, the opposing portion and stacking portion defining a containment volume, the opposing portion having a plurality of opposing features arranged to engagingly cooperate with the stacking features of a stacking portion of a second container assembly when the stacking portion of the second container assembly is positioned beneath at least a part of the opposing portion, the stacking features of the second container assembly being identical to the stacking features of the first container assembly and the opposing features of the first container being arranged in a two-dimensional array such that each opposing feature is positionable inserted between a pair of raised members of a first stacking feature of the second container on one side of the each opposing feature and inserted between a pair of raised members of a second stacking feature of the second container on an opposite side of the each opposing feature.*

*14. A system comprising:*

*a first container assembly including a first portion having a plurality of first portion stacking features, each first portion stacking feature includes first raised members and a plurality of first ribs projecting outwardly from a first portion stacking surface of the first portion, each of the plurality of first ribs extending substantially continuously between adjacently located first raised members, each of the first raised members and first ribs projecting outwardly from the first portion stacking surface, each first raised member having at least one of a width that exceeds a corresponding width of each first rib and protruding outwardly from the first portion stacking surface by a height that exceeds a corresponding height of each first rib; and*

*a second container assembly including a second portion that includes second portion stacking features substantially identical to the first portion stacking features and including a plurality of second raised members and a plurality of second ribs, each of the plurality of second ribs extending substantially continuously between adjacently located second raised members,*

*wherein the first container assembly further includes a first opposing portion positioned opposite the first portion, the first portion and first opposing portion defining a containment volume, the first opposing portion having a plurality of opposing portion stacking features arranged to engagingly cooperate with the second container assembly, wherein the second portion is positionable in contact with the first opposing portion, the opposing portion stacking features arranged in an array such that each opposing portion stacking feature is positionable at least one of between adjacent second portion stacking features and between adjacent second raised members of the adjacent second portion stacking features.*

*15. The system of claim 14, wherein each opposing stacking feature includes repetitive sets of opposing portion first members continuously adjoined to opposing portion second members, each of the opposing portion first members and opposing portion second members projecting outwardly from an opposing portion stacking surface, each opposing portion first member of the set having a width that exceeds a corresponding width of each opposing portion second member of the set.*

*16. The system of claim 14, wherein a height of the first raised member exceeds a height of the first ribs relative to the upper stacking surface.*

*17. The system of claim 14, wherein a linear distance between the first raised members of adjacent upper stacking features is less than a corresponding linear distance between first ribs of adjacent first portion stacking features.*

*18. The system of claim 14, wherein the first portion stacking features of the first portion are disposed in at least two rows on the first portion stacking surface, a first centerline of a first row being separated from a second centerline of a second row by a desired distance.*

*19. The system of claim 14, wherein the opposing portion stacking features includes a plurality of second raised members projecting from the opposing portion stacking surface.*

*20. The system of claim 14, wherein the first portion stacking feature of the first portion is oriented substantially parallel relative to an edge of the first portion.*

* * * * *